United States Patent
Wang

(10) Patent No.: US 7,751,636 B2
(45) Date of Patent: Jul. 6, 2010

(54) METHOD FOR DECODING TRANSFORM COEFFICIENTS CORRESPONDING TO AN IMAGE

(75) Inventor: Yu-Min Wang, Hsin-Chu Hsien (TW)

(73) Assignee: Faraday Technology Corp., Science-Based Industrial Park, Hsin-Chu (TW)

( * ) Notice: Subject to any disclaimer, the term of this patent is extended or adjusted under 35 U.S.C. 154(b) by 1321 days.

(21) Appl. No.: 11/162,795

(22) Filed: Sep. 23, 2005

(65) Prior Publication Data

US 2007/0071102 A1    Mar. 29, 2007

(51) Int. Cl.
*G06K 9/36* (2006.01)
(52) U.S. Cl. .................... 382/245; 382/233
(58) Field of Classification Search ......... 382/232–251; 375/240.02–240.29; 341/67
See application file for complete search history.

(56) References Cited

U.S. PATENT DOCUMENTS

| 6,580,833 B2 * | 6/2003 | Goertzen | 382/244 |
| 2003/0085822 A1 * | 5/2003 | Scheuermann | 341/67 |

OTHER PUBLICATIONS

Young et al., "Motion Estimation for High Performance Transcoding", IEEE Published on 1998, pp. 649-658.*

\* cited by examiner

*Primary Examiner*—Duy M Dang
(74) *Attorney, Agent, or Firm*—Winston Hsu

(57) ABSTRACT

A method of decoding CAVLC transform coefficients encoded from an image uses a plurality of registers for storing coefficients and flags and a plurality of MUX devices for selecting data input for corresponding registers. The method includes receiving transform coefficients including first and second encoded data corresponding to an image, generating a trailing-one coefficient with a sign indicated by the first encoded data together with a flag value corresponding to a status of the trailing-one coefficient, and generating a non-trailing zero coefficient according to the second encoded data together with a flag value corresponding to a status of the non-trailing zero coefficient.

15 Claims, 14 Drawing Sheets

| flag(1) | flag(2) | flag(3) | ... | flag(n) |
|---------|---------|---------|-----|---------|
| reg(1)  | reg(2)  | reg(3)  | ... | reg(n)  |

Fig. 2

| Step D | flag(1) | flag(2) | flag(3) | flag(4) | flag(5) | flag(6) | flag(7) | flag(8) | ⋮ |
|---|---|---|---|---|---|---|---|---|---|
|  | 1 | 1 | 1 | 0 |  |  |  |  |  |
|  | reg(1) | reg(2) | reg(3) | reg(4) | reg(5) | reg(6) | reg(7) | reg(8) |  |
|  | 1 | −1 | −1 | 1 |  |  |  |  |  |

| Step E | flag(1) | flag(2) | flag(3) | flag(4) | flag(5) | flag(6) | flag(7) | flag(8) | ⋮ |
|---|---|---|---|---|---|---|---|---|---|
|  | 1 | 1 | 1 | 1 | 0 |  |  |  |  |
|  | reg(1) | reg(2) | reg(3) | reg(4) | reg(5) | reg(6) | reg(7) | reg(8) |  |
|  | 3 | 1 | −1 | −1 | 1 |  |  |  |  |

Fig. 4

| Step F | flag(1) | flag(2) | flag(3) | flag(4) | flag(5) | flag(6) | flag(7) | flag(8) | ... |
|---|---|---|---|---|---|---|---|---|---|
| | 1 | 1 | 1 | 1 | 1 | 1 | 1 | 0 | |
| | reg(1) | reg(2) | reg(3) | reg(4) | reg(5) | reg(6) | reg(7) | reg(8) | |
| | 0 | 0 | 0 | 3 | 1 | -1 | -1 | 1 | |

Fig. 5

| Step I | flag(1) | flag(2) | flag(3) | flag(4) | flag(5) | flag(6) | flag(7) | flag(8) | ⋮ |
|---|---|---|---|---|---|---|---|---|---|
| | 1 | 1 | 1 | 1 | 0 | 0 | 0 | 0 | |
| | reg(1) | reg(2) | reg(3) | reg(4) | reg(5) | reg(6) | reg(7) | reg(8) | |
| | 0 | 0 | 3 | 1 | −1 | −1 | 0 | 1 | |

Fig. 8

| Step J | flag(1) | flag(2) | flag(3) | flag(4) | flag(5) | flag(6) | flag(7) | flag(8) |
|---|---|---|---|---|---|---|---|---|
| | 1 | 1 | 1 | 0 | 0 | 0 | 0 | 0 |
| | reg(1) | reg(2) | reg(3) | reg(4) | reg(5) | reg(6) | reg(7) | reg(8) |
| | 0 | 0 | 3 | 1 | -1 | -1 | 0 | 1 |

Fig. 9

| Step M | flag(1) | flag(2) | flag(3) | flag(4) | flag(5) | flag(6) | flag(7) | flag(8) | ... |
|---|---|---|---|---|---|---|---|---|---|
| | 0 | 0 | 0 | 0 | 0 | 0 | 0 | 0 | |
| | reg(1) | reg(2) | reg(3) | reg(4) | reg(5) | reg(6) | reg(7) | reg(8) | |
| | 0 | 3 | 0 | 1 | -1 | -1 | 0 | 1 | |

Fig. 11

METHOD FOR DECODING TRANSFORM COEFFICIENTS CORRESPONDING TO AN IMAGE

BACKGROUND OF THE INVENTION

1. Field of the Invention

The present invention is related to a method for decoding transform coefficients corresponding to an image, and more particularly, to a method for decoding CAVLC transform coefficients corresponding to an image.

2. Description of the Prior Art

Getting digital video from its source (a camera or a stored clip) to its destination (a display) involves a chain of components or processes. Key to this chain is the process of compression (encoding) and decompression (decoding), in which bandwidth-intensive 'raw' data is reduced to a manageable size for transmission or storage, and then reconstructed for display. Better compression and decompression can give a significant technical and commercial edge to a product, providing better image quality, greater reliability and more flexibility. There is therefore a keen interest in the continuing development and improvement of video compression and decompression methods and systems. The early successes in the digital video industry were underpinned by international standard ISO/IEC 13818 [1], popularly known as "MPEG-2". Anticipation of a need for better compression tools has led to the development of two further standards for video compression, known as ISO/IEC 14496 Part 2 (commonly known as "MPEG-4") and ITU-T Recommendation H.264/ISO/IEC 14496 Part 10 (commonly known as "H.264").

Image signals demonstrate close correlations between spatially neighboring pixels and thus transformation into the frequency domain leads to deviation of information to the low frequency region, which enables reduction of redundancy by making use of the deviation. Therefore, the typical image encoding methods adopt a technique of subjecting image signals to an orthogonal transformation to transform them into orthogonal transform coefficients in the frequency domain, so as to achieve deviation of signal components to the low frequency region. Furthermore, the coefficient values are quantized so that small-valued coefficients are converted into zeros. A coefficient string is made by reading the coefficients in an order from the lowest in the low frequency region and is subjected to entropy coding taking advantage of the deviation of coefficient values, thus achieving efficient encoded data with reduction of redundancy.

A number of encoding techniques are known in the art. For example, one technique encodes the various parameters of a macro-block using a single variable length coding (VLC) scheme. The technique is simple to practice, however the amount of data reduction or compression is only moderately effective. Other techniques, such as context-based adaptive binary arithmetic coding (CABAC) and context-adaptive variable length coding (CAVLC), employ context adaptation and arithmetic coding to improve overall effectiveness. While both techniques feature high compression capability, CAVLC is less complex, easier to practice and requires less memory. Therefore, MPEG-4 and H.264 both adopt CAVLC for encoding data.

Please refer to FIG. 1 for a diagram illustrating an encoding method using CAVLC. FIG. 1 shows a 4×4 block 10 including 16 coefficients obtained from an image. The coefficients at the upper-left corner of the block 10 have lower spatial frequency than those at the lower-right corner of the block 10. The use of CAVLC takes advantage of the presence of a large number of coefficients quantized to zero and the order of the remaining non-zero coefficients. CAVLC exploits the coefficients' statistical correlation by first scanning the block 10 in a zigzag manner, indicated by a dotted arrow in FIG. 1, approximately from the coefficients with the lowest spatial frequency to the highest into a one-dimensional array. The zigzag scan produces a bitstream of (0, 3, 0, 1, −1, −1, 0, 1, 0, 0, 0, 0, 0, 0, 0, 0) representing the block 10. Among the non-zero coefficients of the bitstream, the coefficients of "+1" or "−1" are trailing-one coefficients, the zero coefficients appearing after the last non-zero coefficients (in the zigzag scan order) are trailing-zero coefficients, while the zero coefficients appearing before the last non-zero coefficients (in the zigzag scan order) are non-trailing zero coefficients, The encoding of the bitstream based on CAVLC proceeds as follows. First, the number of non-zero and trailing-one coefficients are encoded as "total_coefficient" and "trailing_ones", respectively. Second, the sign of each trailing-one coefficient is encoded in "trailing_one_sign". Then the levels of the remaining non-zero coefficients are encoded in "level". Lastly, the number of non-trailing zero coefficients and their respective run before values (block position information) are encoded in "total_zero" and "run-before", respectively. In FIG. 1 the "trailing_ones" is clipped at 3 and the remaining trailing-one coefficients are encoded in "total_coefficient". After CAVLC encoding, a plurality of transform coefficients {5, 3, +, −, −, 1, 3, 3, 1, 0, 0, 1, 1} can be generated from the block 10 and are described in more detail as follows:

"total_coefficient"=5
"trailing_ones"=3
"trailing_one_sign"=+, −, −
"level"=1, 3
"total_zero"=3
"run-before"=1, 0, 0, 1, 1

In the MPEG-4 and H.264 standards, decoding method are not specified. There are therefore various techniques used to decode the coefficients of the block 10 from the transform coefficients after CAVLC coding. Conventionally, a reference software implementation uses pattern-matching to obtain the number of coefficients and the number of trailing ones. In this software implementation, pattern matching is used between the codes in an encoder lookup table (LUT) and the bits at the head of the bitstream. Other implementations use LUTs to obtain the number of coefficients and the number of trailing ones. However, because of the size of the tables is large in order to accommodate all of the possible inputs, the use of these tables is not efficient and is slow. Similarly, LUTs are used in prior art implementations to obtain the number of total zeros, and have the same limitations as those implementations to obtain the number of coefficients and the number of trailing ones.

SUMMARY OF THE INVENTION

It is therefore a primary objective of the claimed invention to provide a method for decoding transform coefficients corresponding to an image in order to solve the problems of the prior art.

The claimed invention discloses a method for decoding transform coefficients corresponding to an image. The method comprises receiving transform coefficients generated from a bitstream encoded from an image, the transform coefficients comprising first encoded data including a sign of a trailing-one coefficient in the bitstream and second encoded data including a position of a non-trailing zero coefficient in the bitstream; generating the trailing-one coefficient with a sign indicated by the first encoded data, and a flag value corresponding to a status of the trailing-one coefficient; and generating the non-trailing zero coefficient according to the second encoded data, and a flag value corresponding to a status of the non-trailing zero coefficient.

The claimed invention discloses another method for decoding transform coefficients corresponding to an image. The method comprises receiving transform coefficients generated from a bitstream encoded from an image, the transform coefficients comprising first encoded data including a sign of a trailing-one coefficient in the bitstream, second encoded data including a position of a non-trailing zero coefficient in the bitstream, and third encoded data including a non-zero coefficient; generating the trailing-one coefficient with a sign indicated by the first encoded data, and a flag value corresponding to a status of the trailing-one coefficient; generating the non-trailing zero coefficient according to the second encoded data, and a flag value corresponding to a status of the non-trailing zero coefficient; and generating the non-zero coefficient according to the third encoded data, and a flag value corresponding to a status of the non-zero coefficient.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 shows a diagram illustrating the coefficient registers and the flag registers used in the present invention.

FIG. 4 shows diagrams illustrating decoding steps of remaining non-zero coefficients according to the present invention.

FIG. 5 shows diagrams illustrating decoding steps of non-trailing zero coefficients according to the present invention.

FIG. 8 shows a diagram illustrating a second run_before operation according to the present invention.

FIG. 9 shows a diagram illustrating a third run_before operation according to the present invention.

FIG. 11 shows diagrams illustrating a fifth run_before operation according to the present invention.

DETAILED DESCRIPTION

The present invention provides a method of decoding CAVLC transform coefficients encoded from an image using a plurality of coefficient registers reg (1)-reg (n) and a plurality of corresponding flag registers flag (1)-flag (n). Please refer to FIG. 2 for a diagram illustrating the coefficient registers reg (1)-reg (n) and the flag registers flag (1)-flag (n) used in the present invention. The coefficient registers reg (1)-reg (n) are used to stored data decoded from the CAVLC transform coefficients. The flag registers flag (1)-flag (n) can be 1-bit registers that can either be set to "0" or "1" for controlling the procedures of the present invention.

Figure 1:
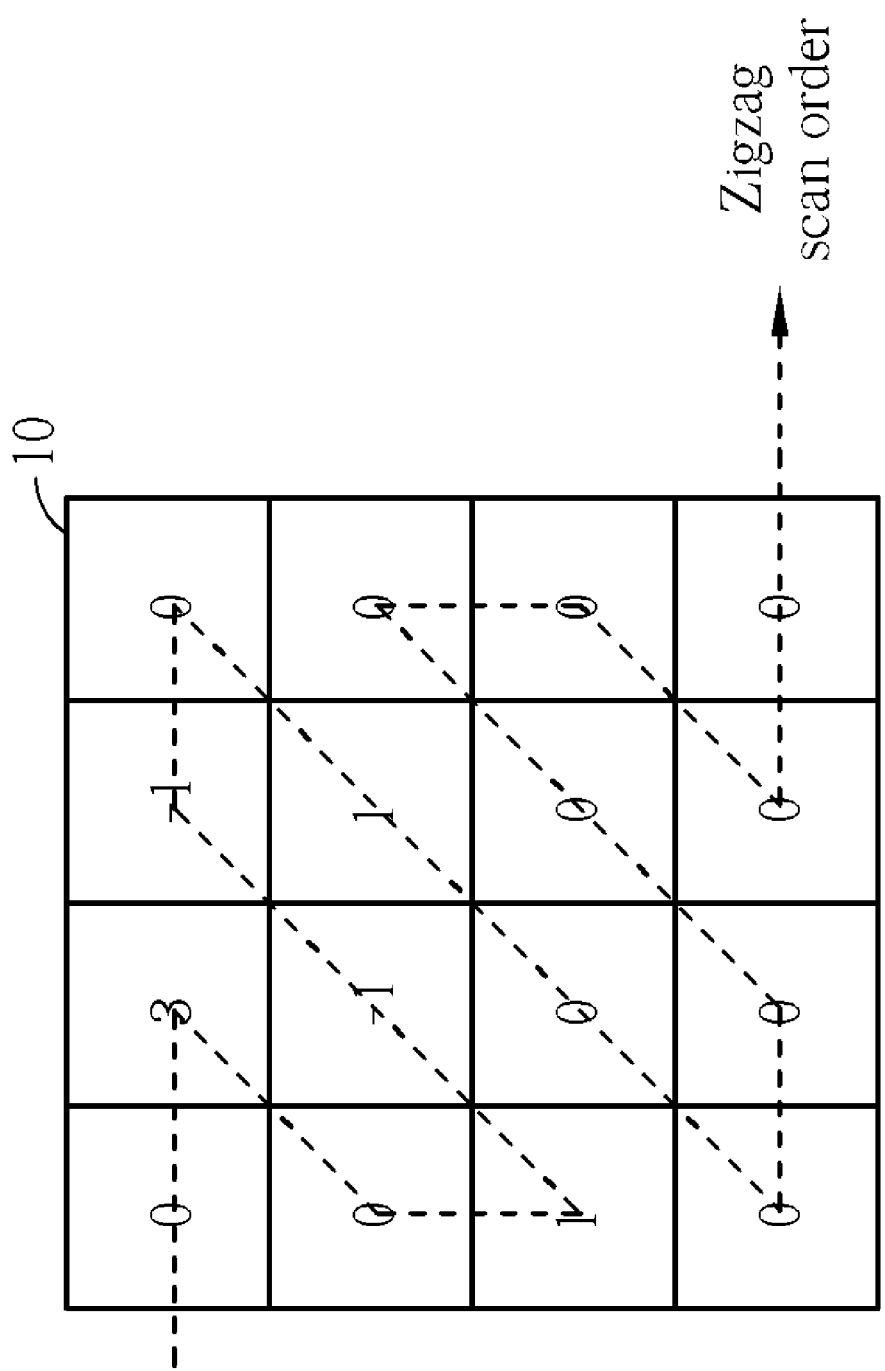
FIG. 1 shows a diagram illustrating an encoding method using CAVLC.

The CAVLC transform coefficients {5, 3, +, −, −, 1, 3, 3, 1, 0, 0, 1, 1} obtained from the block 10 in FIG. 1 are used for illustrating the present invention. For ease of explanation, the "trailing_one_sign", "level" and "run_before" of the CAVLC transform coefficients are named as follows:

trailing_one_sign (1)="+"
trailing_one_sign (2)="−"
trailing_one_sign (3)="−"
level (1)=1
level (3)=3
run_before (1)=1
run_before (2)=0
run_before (3)=0
run_before (4)=1
run_before (5)=1

Figure 3:
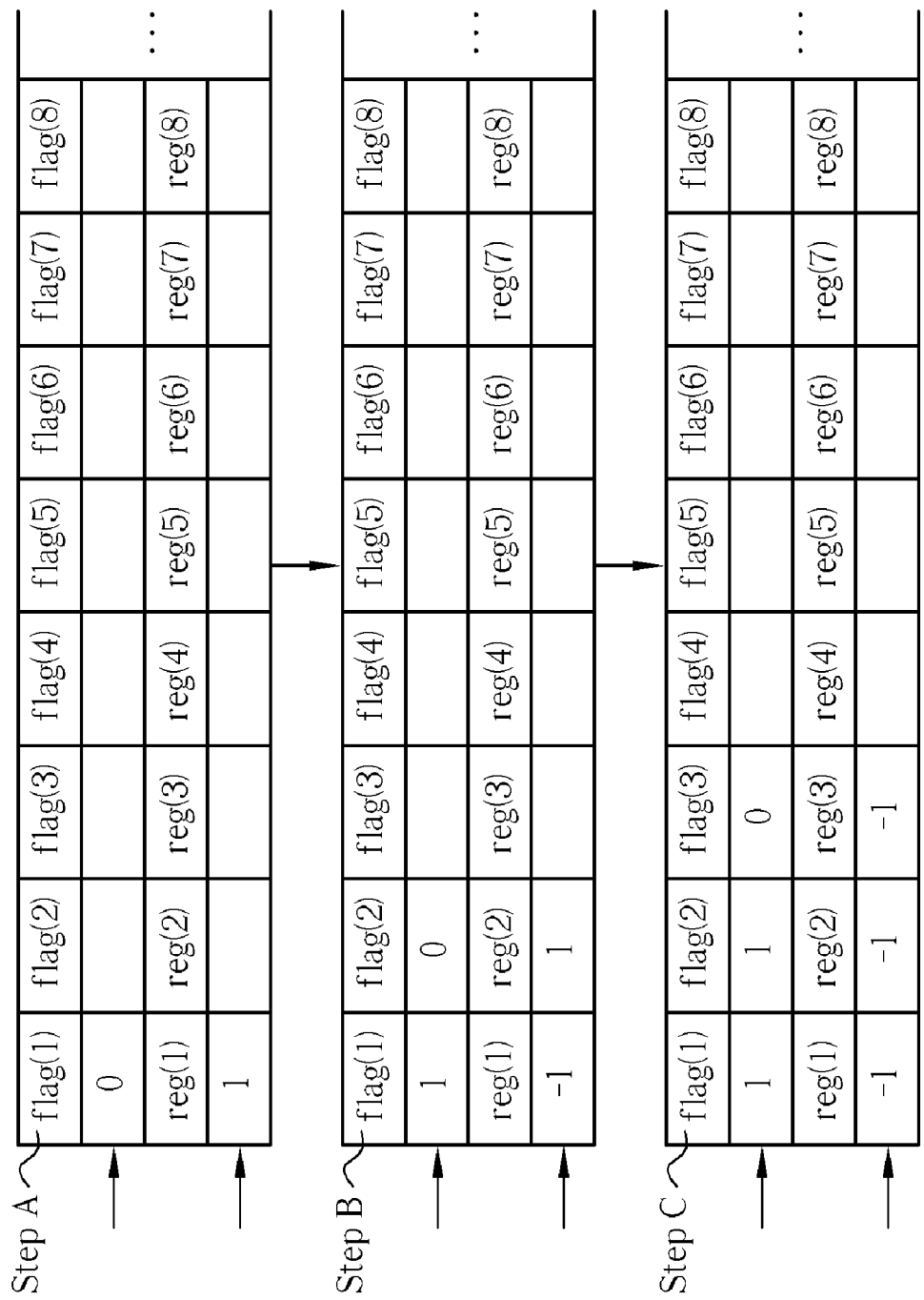
FIG. 3 shows diagrams illustrating decoding steps of trailing-one coefficients according to the present invention.

Please refer to FIG. 3 for diagrams illustrating decoding steps of the trailing-one coefficients of the block 10 before CAVLC encoding according to the present invention. Based on "trailing_ones" and the trailing_one_sign (1)-(3), it can be determined that the block 10 includes three trailing-one coefficients of "1", "−1" and "−1" before CAVLC encoding. In step A, data of "1" indicated by trailing_one_sign (1) is stored in the coefficient registers reg (1) and the corresponding flag register flag (1) is set to "0". In step B, data stored in reg (1) and flag (1) is shifted to reg (2) and flag (2), respectively, and then data of "−1" indicated by trailing_one_sign (2) is stored in the coefficient register reg (1) and the corresponding flag register flag (1) is set to "1". In step C, data stored in reg (1)-(2) and flag (1)-(2) is shifted to reg (2)-(3) and flag (2)-(3), respectively, and the data of "−1" indicated by trailing_one_ sign (3) is stored in the coefficient register reg (1) and the corresponding flag register flag (1) is set to "1". After steps A-C, the values of the trailing-one coefficients of "1", "−1" and "−1" of the block 10 can be obtained.

Please refer to FIG. 4 for diagrams illustrating decoding steps of the remaining non-zero coefficients (excluding the trailing-one coefficients) of the block 10 before CAVLC encoding according to the present invention. Based on the difference between the "total_coefficient" and "trailing_ones", the number of the remaining non-zero coefficients can be determined, and the values of the remaining non-zero coefficients are indicated by level (1) and level (3). Therefore, it can be determined that the block 10 includes two remaining non-zero coefficients of "1" and "3" before CAVLC encoding. In step D, data stored in reg (1)-(3) and flag (1)-(3) after steps A-C is shifted to reg (2)-(4) and flag (2)-(4), respectively, and then data of "1" indicated by level (1) is stored in the coefficient register reg (1) and the corresponding flag register flag (1) is set to "1". In step E, data stored in reg (1)-(4) and flag (1)-(4) after steps A-D is shifted to reg (2)-(5) and flag (2)-(5), respectively, and then data of "3" indicated by level (3) is stored in the coefficient register reg (1) and the corresponding flag register flag (1) is set to "1". After steps shown in Fig. A-E, the values of the trailing-one coefficients of "1", "−1" and "−1" together with the remaining non-zero coefficients of "1" and "3" of the block 10 can be obtained.

Please refer to FIG. 5 for diagrams illustrating a decoding step of the non-trailing zero coefficients of the block 10 before CAVLC encoding according to the present invention. Based on "total_zero", it can be determined that the block 10 includes three non-trailing zero coefficients before CAVLC encoding. In step F, data stored in reg (1)-(5) and flag (1)-(5) after steps A-E is shifted to reg (4)-(8) and flag (4)-(8), respectively, and the flag register flag (1)-(3) are set to "1". Meanwhile, data of "0" can be stored in the reg (1)-(3), or the reg (1)-(3) can include no data. After step F, the correct numbers of the trailing-one coefficients, the remaining non-zero coefficients and the zero coefficients of the block 10 can be obtained.

Figure 6:
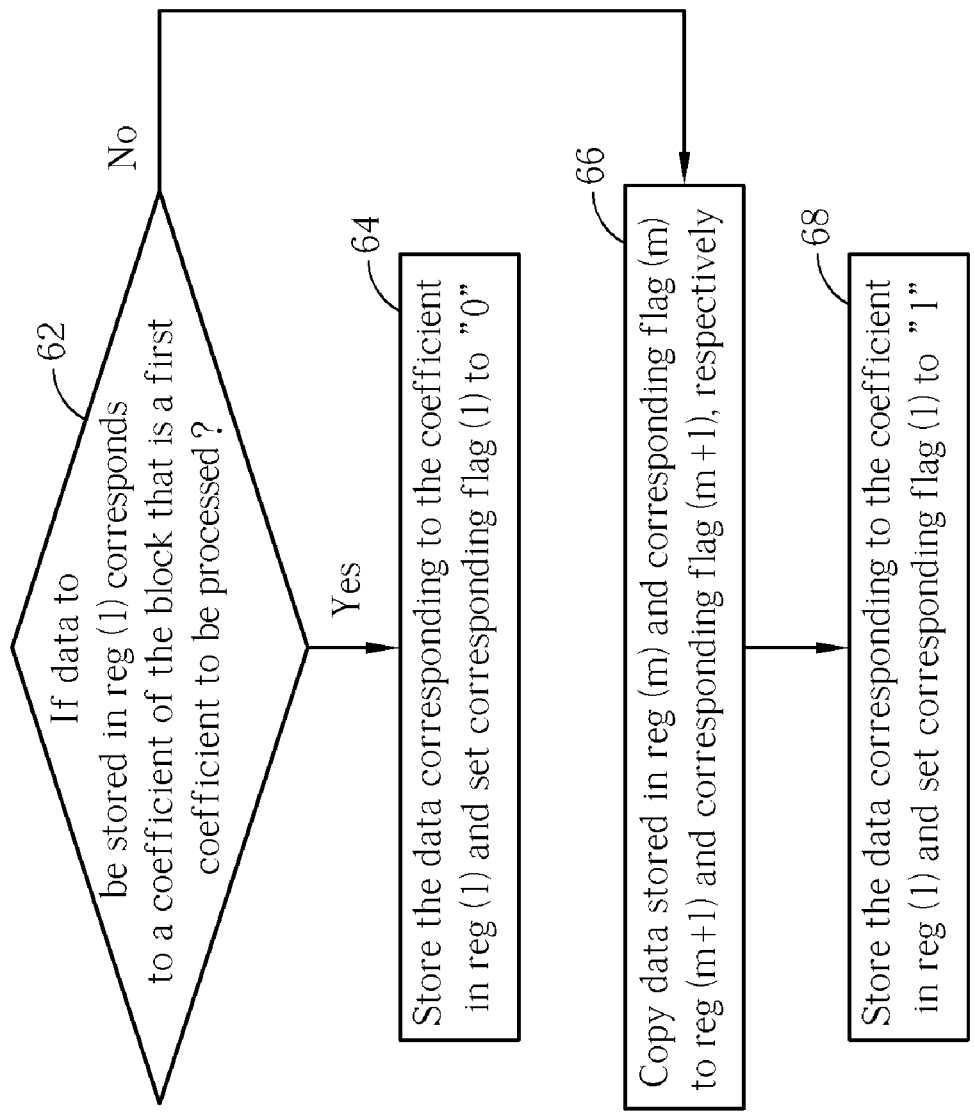
FIG. 6 shows a flowchart illustrating operations of obtaining coefficients described in FIGS. 3-5.

Please refer to FIG. 6 for a flowchart illustrating the operations of obtaining coefficients described in steps A-F. FIG. 6 includes the following steps:

Step 62: determine the status of data to be stored in reg (1); if the data corresponds to a coefficient of the block 10 that is a first coefficient to be processed, execute step 64; if the data corresponds to a coefficient of the block 10 that is not the first coefficient to be processed, execute step 68;

Step 64: store the data corresponding to the coefficient in reg (1) and set corresponding flag (1) to "0";

Step 66: copy data stored in reg (m) and corresponding flag (m) to reg (m+1) and corresponding flag (m+1), respectively (m is an integer between 2 and n); and Step 68: store the data corresponding to the coefficient in reg (1) and set corresponding flag (1) to "1".

After steps shown in step A-F of FIG. 3-5, the correct number and values of the trailing-one coefficients, the remaining non-zero coefficients and the non-trailing zero coefficients of the block 10 have been obtained. However, their corresponding locations in the block 10 might not be correct and have to be determined as well. Please refer to FIG. 7 for diagrams illustrating steps of a run_before operation for arranging the coefficients according to the present invention. The run_before (1)-(5) correspond to the five non-zero coefficients "1", "−1", "−1", "1" and "3" of the block 10 obtained in a zigzag order, respectively. Since run_before [1-5]=[1, 1, 0, 0, 1], it can be determined that among the five non-zero coefficients "1", "−1", "−1", "1" and "3", the first, second and fifth non-zero coefficients are followed by a zero coefficient, while the third and fourth non-zero coefficients are not followed by a zero coefficient.

Figure 7:
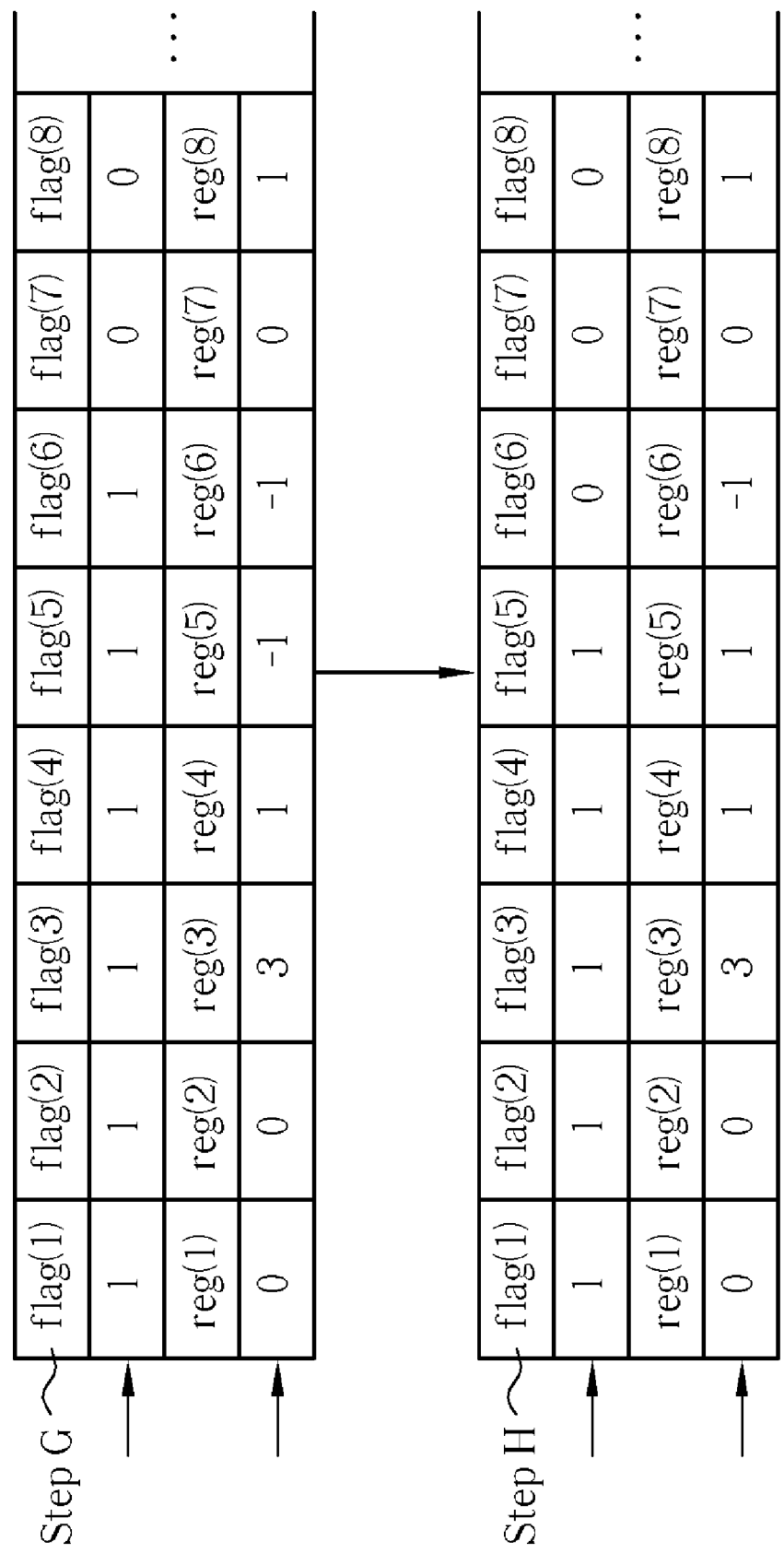
FIG. 7 shows diagrams illustrating a first run_before operation according to the present invention.

Please refer to FIG. 7 for diagrams illustrating a first run_before operation based on run_before (1) according to the present invention. A zero indicated by run_before (1)=1 has to be inserted before the first non-zero coefficient "1" stored in reg (8) with flag (8) set to "0" after steps A-F. In step G, data stored in reg (1)-(7) and flag (1)-(7) after steps A-F is shifted towards left to corresponding adjacent registers. In other words, after shifting reg (1)-(6) and flag (1)-(6) include data originally stored in reg (2)-(7) and flag (2)-(7) after steps A-F, respectively. Then step G is completed by setting both reg (7) and flag (7) to zero. In step H, the first run_before operation based on run_before (1) is completed by setting flag (6) corresponding to the second non-zero coefficient "−1" to "0", indicating the starting point for a next run_before operation.

Please refer to FIG. 8 for a diagram illustrating a second run_before operation based on run_before (2) according to the present invention. Since run_before (2) equals 0, the second non-zero coefficient "−1" is not followed by a zero coefficient. In step I, data stored in reg (6) and flag (6) remains unchanged and flag (5) corresponding the third non-zero coefficient "−1" is set to "0", indicating the starting point for a next run_before operation.

Please refer to FIG. 9 for a diagram illustrating a third run_before operation based on run_before (3) according to the present invention. Since run_before (3) equals 0, the third non-zero coefficient "−1" is not followed by a zero coefficient. In step J, data stored in reg (5) and flag (5) remains unchanged and flag (4) corresponding the fourth non-zero coefficient "1" is set to "0", indicating the starting point for a next run_before operation.

Figure 10:
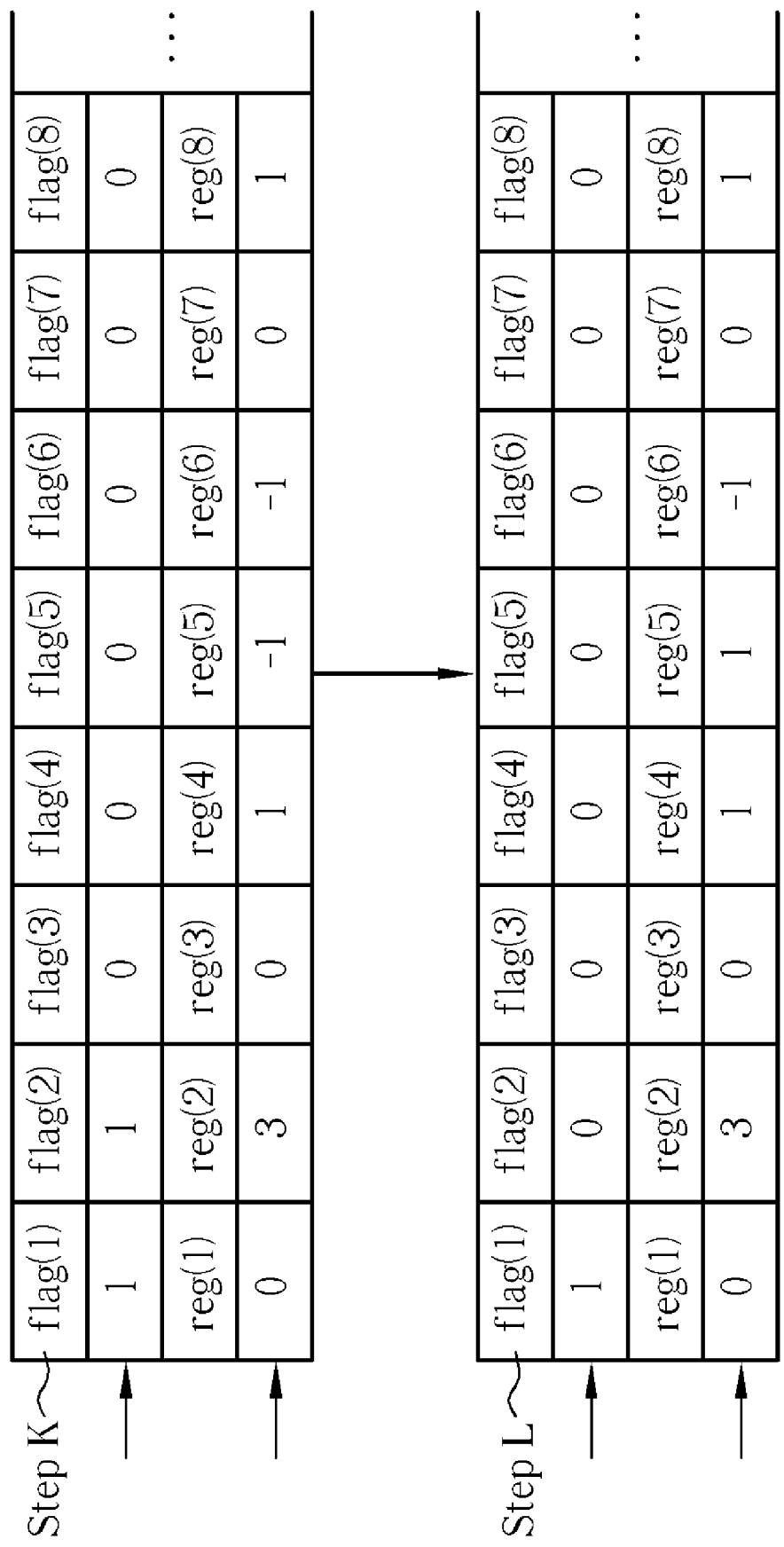
FIG. 10 shows diagrams illustrating a fourth run_before operation according to the present invention.

Please refer to FIG. 10 for diagrams illustrating a fourth run_before operation based on run_before (4) according to the present invention. A zero indicated by run_before (4)=1 has to be inserted before the fourth non-zero coefficient "1" stored in reg (4) with flag (4) set to "0" after steps A-J. In step K, data stored in reg (1)-(3) and flag (1)-(3) after steps A-J is shifted towards left to corresponding adjacent registers. In other words, after shifting reg(1)-(2) and flag (1)-(2) include data originally stored in reg (2)-(3) and flag (2)-(3) after steps A-J, respectively. Then step K is completed by setting both reg (3) and flag (3) to zero. In step L, the forth run_before operation based on run_before (4) is completed by setting flag (2) corresponding the fifth non-zero coefficient "3" to "0", indicating the starting point for a next run_before operation.

Please refer to FIG. 11 for diagrams illustrating a fifth run_before operation based on run_before (5) according to the present invention. A zero indicated by run_before (5)=1 has to be inserted before the fifth non-zero coefficient "3" stored in reg (2) with flag (2) set to "0" after steps A-L. In step M, reg (1) and flag (1) are both set to zero and complete the fifth run_before operation based on run_before (5).

Figure 12:
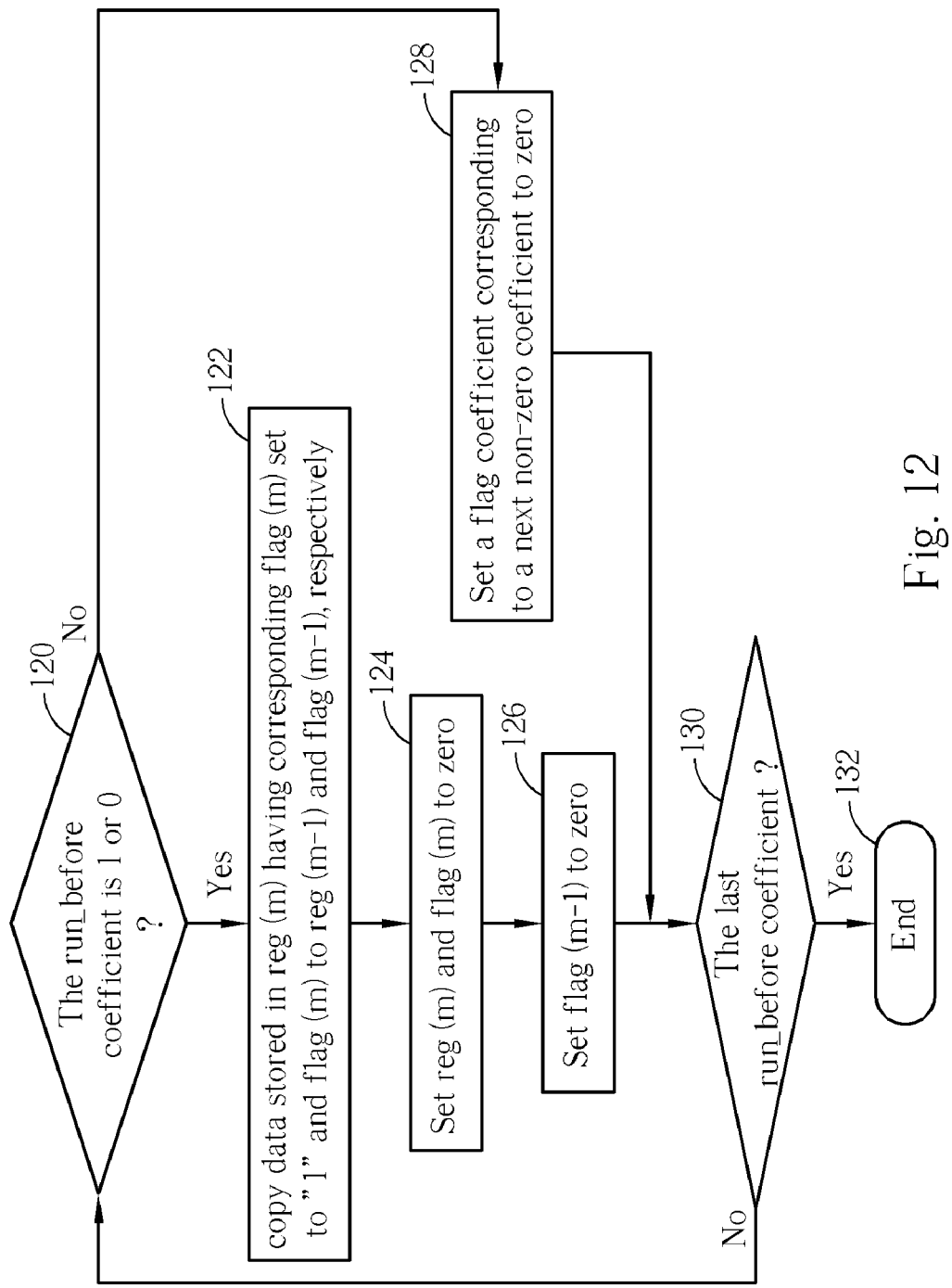
FIG. 12 shows a flowchart illustrating operations of arranging coefficients described in FIGS. 7-11.

Please refer to FIG. 12 for a flowchart illustrating the operations of arranging coefficients described in steps G-M. FIG. 12 includes the following steps:

Step 120: receive and determine the value of a run_before coefficient; if the run_before coefficient is 1, execute step 122; if the run_before coefficient is 0, execute step 128;

Step 122: copy data stored in a coefficient register reg (m) having a corresponding flag register flag (m) set to "1" and the flag (m) to a coefficient register reg (m−1) and a flag register flag (m−1), respectively (m is an integer between 2 and n);

Step 124: set reg (m) and flag (m) to zero;

Step 126: set flag (m−1) to zero; and

Step 128: set a flag coefficient corresponding to a next non-zero coefficient to zero; execute step 120.

Step 130: determine whether the run_before coefficient received in step 120 is a last run_before coefficient; if the run_before coefficient received in step 120 is the last run_before coefficient, execute step 132; if the run_before coefficient received in step 120 is not the last run_before coefficient, execute step 120; and Step 132: End.

Figure 13:
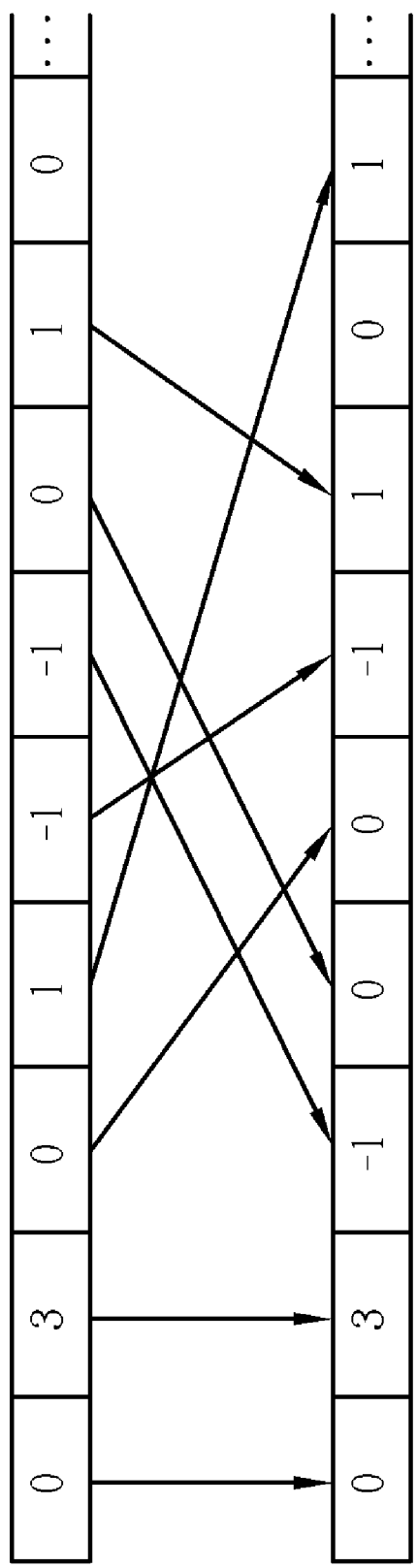
FIG. 13 shows a diagram illustrating re-ordering of the coefficients according to the present invention.

As can be seen in FIG. 11, after steps A-M of the present invention, the correct values and locations of the trailing-one coefficients, the remaining non-zero coefficients and the non-trailing zero coefficients of the block 10 can been obtained. Since the block 10 is a 4×4 matrix including a total of 16 coefficients, the number of trailing zero coefficients can also be obtained easily. Therefore, the block 10 can be reconstructed successfully. The present invention can also include a re-ordering step if the block 10 is not reconstructed according to the original zigzag scan order. For example, if the block 10 is reconstructed in a left-to-right and top-to-bottom direction from the coefficient with the lowest spatial frequency, the re-ordering of the coefficients obtained after steps A-M is shown in FIG. 13. Based on different reconstruction orders, the present invention can also include other re-ordering steps.

In the present invention, the flag registers flag (1)-flag (n) are used to store 1-bit data ("0" or "1") for controlling the operations of the present invention. However, the flag registers in the present invention can also store multiple-bit data as long as the same function can be achieved. Also, when a coefficient register is the starting point for the next operation, or data stored in the coefficient register has been properly re-arranged, a corresponding flag register can be set to "0", as described in the above-mentioned steps A-M, or to "1". When the flag register is set to "1" for indicating that the corresponding coefficient register is the starting point for the next operation, or that data stored in the corresponding coefficient register has been properly re-arranged, a flag register corresponding to a coefficient register that is not the starting point or whose data has not been properly re-arranged is set to "0".

Figure 14:
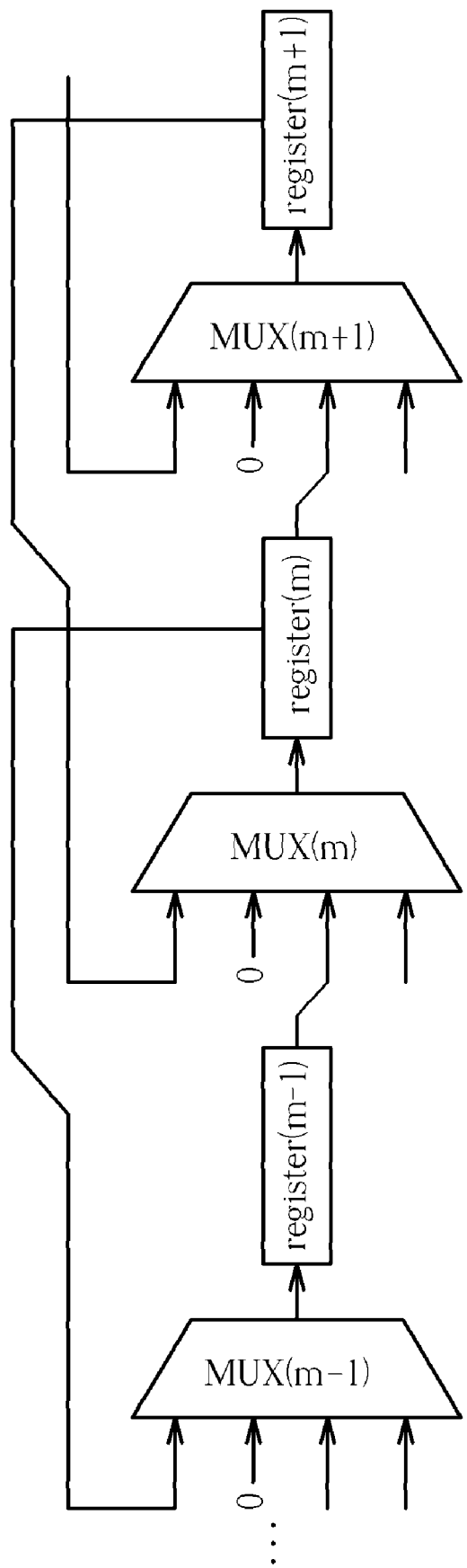
FIG. 14 shows a diagram illustrating an embodiment of the present invention.

In the operations of obtaining coefficients and arranging coefficients shown FIG. 6 and FIG. 12, data stored in the coefficient register reg (m) is either copied to the coefficient register reg (m+1) (step 66), copied to the coefficient register reg (m−1) (step 122), set to zero (step 124), or unchanged (step 126). Similarly, data stored in the flag register flag (m) is either copied to the flag register flag (m+1) (step 66), copied to the flag register flag (m−1) (step 122), set to zero (step 124), or unchanged (after the corresponding coefficient register has been properly re-arranged in steps G-M). In real applications, the present invention can be implemented using a plurality of registers for storing coefficients and flags and a plurality of MUX devices for selecting data input for corresponding registers. Please refer to FIG. 14 for a diagram illustrating an embodiment of the present invention. In FIG. 14, coefficients or flags can be stored in a plurality of registers, and each register includes a corresponding MUX device for selecting data input. For example, MUX (m) can select from data of "0", data stored in register (m−1), in register (m), or in register (m+1) as data input for register (m) depending on the operations.

The present invention provides a method of decoding CAVLC transform coefficients encoded from an image using a plurality of registers for storing coefficients and flags and a plurality of MUX devices for selecting data input for corresponding registers. Compared to the prior art, the present invention does not require large LUTs to accommodate all of the possible inputs of coefficients. Therefore, the present invention provides an efficient decoding method that requires less memory and is easy to be implemented.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for decoding transform coefficients corresponding to an image comprising following steps:
    (a) receiving transform coefficients generated from a bitstream encoded from an image, the transform coefficients comprising:
        first encoded data including a sign of a trailing-one coefficient in the bitstream; and
        second encoded data including a position of a non-trailing zero coefficient in the bitstream;
    (b) generating the trailing-one coefficient with a sign indicated by the first encoded data, and a flag value corresponding to a status of the trailing-one coefficient; and
    (c) generating the non-trailing zero coefficient according to the second encoded data, and a flag value corresponding to a status of the non-trailing zero coefficient.

2. The method of claim 1 wherein the transform coefficients further comprise third encoded data including a non-zero coefficient; the method further comprising step (d): generating the non-zero coefficient according to the third encoded data, and a flag value corresponding to a status of the non-zero coefficient.

3. The method of claim 2 wherein step (d) comprises shifting the non-zero coefficient and the corresponding flag value.

4. The method of claim 3 wherein step (d) further comprises updating the shifted flag value corresponding to the shifted non-zero coefficient.

5. The method of claim 1 wherein step (b) comprises shifting the trailing-one coefficient and the corresponding flag value.

6. The method of claim 5 wherein step (b) further comprises updating the shifted flag value corresponding to the shifted trailing-one coefficient.

7. The method of claim 1 wherein step (c) comprises shifting the non-trailing zero coefficient and updating the corresponding flag value.

8. The method of claim 1 further comprising providing a plurality of coefficient registers for storing coefficients and a plurality of flag registers for storing flags corresponding to statues of the coefficients.

9. A method for decoding transform coefficients corresponding to an image comprising following steps:
    (a) receiving transform coefficients generated from a bitstream encoded from an image, the transform coefficients comprising:
        first encoded data including a sign of a trailing-one coefficient in the bitstream;
        second encoded data including a position of a non-trailing zero coefficient in the bitstream; and
        third encoded data including a non-zero coefficient;
    (b) generating the trailing-one coefficient with a sign indicated by the first encoded data, and a flag value corresponding to a status of the trailing-one coefficient;
    (c) generating the non-trailing zero coefficient according to the second encoded data, and a flag value corresponding to a status of the non-trailing zero coefficient; and
    (d) generating the non-zero coefficient according to the third encoded data, and a flag value corresponding to a status of the non-zero coefficient.

10. The method of claim 9 wherein step (d) comprises shifting the non-zero coefficient and the corresponding flag value.

11. The method of claim 10 wherein step (d) further comprises updating the shifted flag value corresponding to the shifted non-zero coefficient.

12. The method of claim 9 wherein step (b) comprises shifting the trailing-one coefficient and the corresponding flag value.

13. The method of claim 12 wherein step (b) further comprises updating the shifted flag value corresponding to the shifted trailing-one coefficient.

14. The method of claim 9 wherein step (c) comprises shifting the non-trailing zero coefficient and updating the corresponding flag value.

15. The method of claim 9 further comprising providing a plurality of coefficient registers for storing coefficients and a plurality of flag registers for storing flags corresponding to statuses of the coefficients.

* * * * *